United States Patent [19]
Lichtenberg et al.

[11] Patent Number: 5,500,309
[45] Date of Patent: Mar. 19, 1996

[54] NI/METAL HYDRIDE ACCUMULATOR

[75] Inventors: Frank Lichtenberg, Zeiskam; Klaus Kleinsorgen, Kelkheim; Günter Hofmann, Hofheim, all of Germany

[73] Assignee: Varta Batterie Aktiengesellschaft, Hanover, Germany

[21] Appl. No.: 346,897

[22] Filed: Nov. 30, 1994

[30] Foreign Application Priority Data

Dec. 18, 1993 [DE] Germany .......................... 43 43 321.9

[51] Int. Cl.$^6$ ............................................. H01M 4/52
[52] U.S. Cl. ................................................... 429/223
[58] Field of Search ............................... 429/223, 232

[56] References Cited

U.S. PATENT DOCUMENTS

| | | | |
|---|---|---|---|
| 4,130,696 | 12/1978 | Gunter | 429/223 |
| 4,514,473 | 4/1985 | Atkin et al. | 429/10 |
| 4,663,256 | 5/1987 | Corrigan | 429/223 |
| 4,935,318 | 6/1990 | Ikoma et al. | 429/206 |
| 5,032,475 | 7/1991 | Hasebe et al. | 429/60 |

OTHER PUBLICATIONS

Japanese Kokai; 63–334, Jan. 5, 1988, Production of Resin–Bonded Carbon Molding, Abstract.

*Primary Examiner*—Prince Willis, Jr.
*Assistant Examiner*—Richard H. Lilley, Jr.
*Attorney, Agent, or Firm*—Weiser & Associates

[57] ABSTRACT

The positive electrode of a Ni/metal hydride accumulator is formed from a mass mixture of $Ni(OH)_2$ and an oxidation-resistant graphite. The stable graphite is notable for a high degree of crystallinity and a low ash content. In conventional Ni/metal hydride accumulators, cobalt compounds play an essential part in developing a conductive matrix within their positive nickel hydroxide electrodes, leading to reductive destruction of the matrix by severe high temperature short circuit testing. In contrast, the same accumulators, with positive electrodes produced according to the present invention, survive the test with only a temporary and slight decline in capacity.

9 Claims, 1 Drawing Sheet

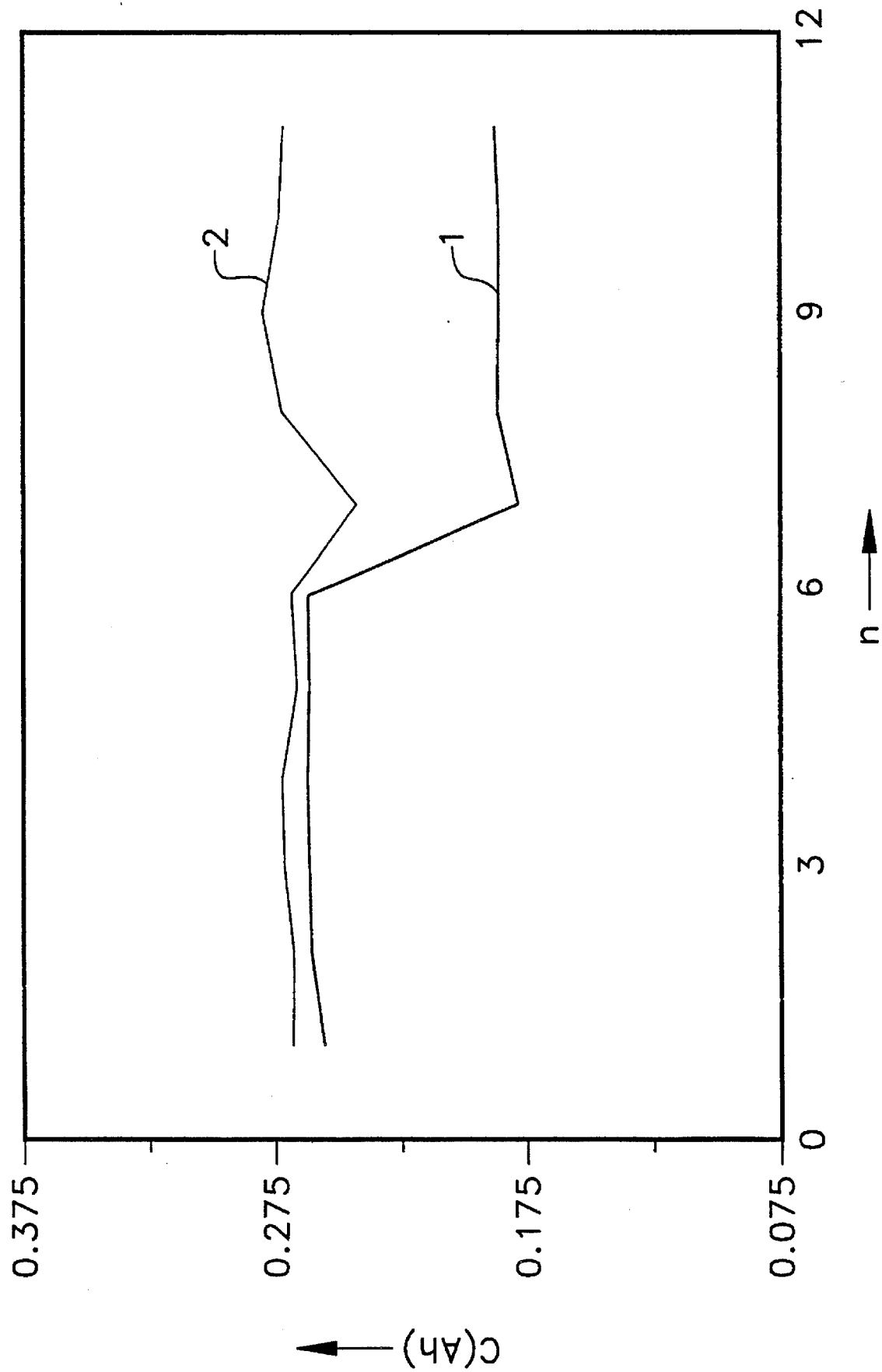

NI/METAL HYDRIDE ACCUMULATOR

BACKGROUND OF THE INVENTION

The present invention relates to an electric accumulator having a positive nickel-hydroxide electrode, a negative electrode comprised of a hydrogen storage alloy, an interposed separator and an alkaline electrolyte.

It is known that by forming metal hydrides, numerous metals and alloys are able to absorb and store significant amounts of hydrogen. This ability is the basis for an energy storage system which, in addition to the conventional Ni/Cd accumulator or the lead-acid battery, has recently met with a great deal of interest; namely, the Ni/metal hydride accumulator.

In such systems, positive and negative electrodes are arranged in an alkaline electrolyte, and separated from one another, as is usual in other systems. However, in this arrangement, the positive electrode in principle corresponds to the positive nickel hydroxide electrode of a Ni/Cd accumulator.

According to present standards, for example, in accordance with U.S. Pat. No. 4,935,318, the active mass of the electrode contains, in addition to nickel hydroxide as the main component, a conducting medium in the form of nickel metal powder, cobalt metal powder, certain foreign hydroxides (especially cobalt hydroxide), and a binder. These constituents are mixed in a dry state. The dry mixture is then mixed with water, to form a paste, and spread into a highly porous three-dimensional nickel matrix.

When an electric current is applied to the negative electrode of a Ni/metal hydride secondary cell (Ni/MH), the active material (i.e., the metal or the alloy M capable of absorbing hydrogen) is charged by the absorption of hydrogen:

$$M + xH_2O + e^- \rightarrow MH_x + xOH^- \quad (1)$$

During discharging, the stored hydrogen is released so that an electric current is generated:

$$MH_x + xOH^- \rightarrow M + xH_2O + e^- \quad (2)$$

Both reactions are reversible.

A similar situation applies to the reactions taking place at the positive nickel hydroxide electrode.

$$\text{Charging: } Ni(OH)_2 + OH^- \rightarrow NiOOH + H_2O + e^- \quad (3)$$

$$\text{Discharging: } NiOOH + H_2O + e^- \rightarrow Ni(OH)_2 + OH^- \quad (4)$$

Ni/metal hydride batteries, even today, offer distinct advantages compared to conventional secondary batteries. This is because an environmentally friendly energy source, hydrogen, is used in conjunction with the well-established, in principle identical positive electrode of a Ni/Cd accumulator.

Ni/metal hydride batteries are gas-tight and maintenance-free. Due to rather advanced electrode fabrication technologies, such batteries have already attained energy densities of 50 Wh/kg. Here, the quality of the positive electrode plays a particularly important part, since it limits the capacity.

Prior to the introduction of rapidly chargeable Ni/Cd button cells, the conducting medium used in nickel hydroxide electrodes (instead of the nickel powder which is customary today) was graphite. The positive electrode mainly consisted of mercury (II) oxide. German Patent No. 1,771,420 likewise proposes an addition of graphite to metal oxide/hydrogen cells to improve their conductivity.

The addition of cobalt and cobalt oxides (owing to their conductivity), which only later became customary (in addition to nickel metal powder as the conducting material), promotes mass utilization of the nickel hydroxide electrode. Such additions also serve to set a discharge reserve on the negative electrode since, during the first charging of the cell, prior to oxidation of the $Ni(OH)_2$, stable conductive cobalt oxides (CoOOH) are formed having an oxidation potential lower than that of NiOOH. As such, if the end-of-discharge voltage does not drop significantly below 1 V and the total charge supplied (once) to form the cobalt oxides is retained by the negative electrode as an excess capacity (discharge reserve) with respect to the positive electrode, such additions will no longer take part in subsequent reactions. However, under extraordinary operating conditions (e.g. polarity reversal, exhaustive discharge), the conductive matrix may be reductively destroyed.

Most commercial Ni/metal hydride accumulators, whether they are round cells, prismatic cells or button cells, present a serious problem in that they generally cannot withstand the high temperature short circuit (HTSC) test which is conventionally performed by battery customers in the industry. In this test, the cells in the discharged state are loaded with a 2 Ω resistor and stored for 3 days at 65° C. Then, a capacity test is carried out during a few charging/discharging cycles at room temperature. The test simulates long-term short-circuit behavior in electronic appliances. The high temperature shortens the duration of the test. In so doing, massive irreversible losses in capacity are found. Such losses are due to reductive destruction of the CoOOH conductive matrix as a result of the negative potential of the metal hydride electrode being impressed on the positive electrode during the short circuit.

SUMMARY OF THE INVENTION

It is therefore the primary object of the present invention to provide an alkaline Ni/metal hydride accumulator which can withstand HTSC testing.

This and other objects are achieved in accordance with the present invention by an electric accumulator having a positive nickel-hydroxide electrode, a negative electrode comprised of a hydrogen storage alloy, an interposed separator and an alkaline electrolyte, wherein the nickel hydroxide mass of the positive electrode is admixed with an oxidation-resistant graphite as a conducting medium. It has been found that the accumulator failure previously caused by the positive electrode is stabilized by manufacturing the electrode from a mass mixture of nickel hydroxide powder and an oxidation-resistant graphite as the conducting medium. As a result, the reduction-prone CoOOH conductive matrix no longer acts as the main conductive matrix. Instead, the inert graphite serves this purpose.

For further detail regarding the electric accumulator of the present invention, reference is made to the following detailed description, and a single FIGURE illustrating a graph showing comparative performance characteristics.

DETAILED DESCRIPTION OF PREFERRED EMBODIMENTS

Admittedly, the addition of graphite to Ni/Cd cells has been known for some time, as previously mentioned. However, the grades of graphite which were previously available were only conditionally suitable for their intended purpose.

This is because in alkaline cells, such materials were subject to oxidation according to the equation:

$$C+O_2+2KOH \rightarrow K_2CO_3+H_2O \qquad (5)$$

The less oxidation-resistant is the graphite, the more $K_2CO_3$ is eventually formed. In the case of Ni/Cd cells, this reaction manifests itself by a stepped voltage drop. A possible cause of this is the shift of the potential-forming reaction from $Cd/Cd(OH)_2$ to $Cd/CdCO_3$. In addition, as more $K_2CO_3$ is formed, the conductivity of the electrolyte deteriorates. For these two reasons, the use of Ni powder as the conducting material in Ni/Cd button cells, instead of graphite, has become generally established.

In contrast to Ni/Cd cells, Ni/metal hydride cells are not affected by the foregoing voltage drop. This is because the formation of $K_2CO_3$ does not enter into the negative electrode reaction, $M+xH \leftrightarrows MH_x$ (M is a hydrogen-storing alloy). Only the ion conductivity of the electrolyte is adversely affected as more $K_2CO_3$ is formed. However, by employing an oxidation-resistant graphite, in accordance with the present invention, this drawback can also be overcome so that the graphite becomes an advantageous alternative conducting material for the positive electrode masses in Ni/metal hydride accumulators.

The particular chemical resistance of this graphite is predominantly based on its high degree of crystallinity. In accordance with the present invention, it has been found that crystallite sizes of at least 180 nm, and preferably of at least 200 nm, are suitable. The crystallite size, $L_c$ (also called "stack height"), is determined by X-ray powder diffraction on the basis of the Scherrer Equation, $D=(K \times \lambda) / (\beta \times \cos \delta)$ Here, D (which equals $L_c$) is the edge length of the crystallite, in its principal direction (in graphite, the c axis). K is a constant with a value on the order of 1. $\beta$ is the half-intensity width of a selected reflex (the reflexes 002 and 004 are being used as the basis of calculation for graphite) after the elimination of experimental effects.

A further criterion of the oxidation-resistant graphite is its ash content. This should be less than 0.5% and preferably less than 0.3%. The BET area of the material should be less than 6 $m^2/g$.

Oxidation-resistant graphites of the quality required for use according to the present invention have recently become commercially available. An example of this is "Lonza SFG 75".

The weight ratio of the constituents of the novel positive mass of the present invention should be from 75 to 90% of $Ni(OH)_2$ (and preferably approximately 85%) and from 1 to 25% of graphite (and preferably approximately 15%). In principle, higher graphite proportions of up to 35% by weight are also possible.

The beneficial effect of the improvements of the present invention can be demonstrated experimentally. To this end, two test series of button cells were selected (because they are readily fitted). The positive electrodes of one test series of 6 cells were prepared from a mixture, according to the present invention, of 85% by weight of $Ni(OH)_2$ and 15% by weight of oxidation-resistant graphite. The positive electrodes of a second test series of 6 cells comprised a conventional mixture of 66% by weight of $Ni(OH)_2$, 30% by weight of Ni, 3% by weight of CoO and 1% by weight of Co (i.e., standard cells). In each case, the negative electrodes were compacted-powder pellets made of a hydrogen storage alloy.

Prior to cell assembly, all the positive electrodes were stored overnight in Co-containing aqueous KOH at 80° C. After assembly, the cells were put into service, as usual. The charging/discharging current was 50 mA, and the end-of-discharge voltage was set to 0.7 V. After the 6th cycle, the cells were subjected to an HTSC test. The initial cyclic treatment was then continued for an additional 5 cycles, in order to determine the effect of the HTSC test on capacity behavior.

The results of this HTSC testing, showing the capacity development (C[Ah] as a function of [n] cycles) of Ni/hydride cells produced according to the present invention as compared with the standard cells, are shown in the single FIGURE of the drawings. In each case, the illustrated curves are averaged from measured data of one or the other groups of cells under test.

As is apparent from curve 1, representing the HTSC test for the standard cells, there is a serious drop in capacity from which the cells do not recover in the further course of their cyclic treatment. In contrast, and referring now to curve 2, the "graphite cells" of the present invention exhibit a much smaller decline in capacity, and within 2 to 3 subsequent cycles, a recovery takes place in which the original capacity is regained. These test results confirm that the loss in capacity is due to the positive electrode.

Without wishing to be bound by the following, a possible explanation could be that in the cobalt-containing positive electrodes of conventional cells, the first charging operation builds up a stable conductive matrix of $\beta$-CoOOH which surrounds the poorly conductive nickel hydroxide particles, much like a net. However, under the conditions of the HTSC test, the potential of the positive electrode can be shifted so strongly to negative values that the $\beta$-CoOOH network structure is reduced to $\beta$-Co(OH)$_2$ and is destroyed as a result. Due to an absence of inherent conductivity, the original conductive matrix is no longer able to reactivate nickel hydroxide which has likewise been discharged to the oxidation state of $Ni^{2+}$, and which in any case is nonconductive and inactive due to its crystal nature being low in water. However, the novel graphite material of the present invention, having the characteristics specified above, provides a stable electrode matrix which is obviously capable of reactivation and which behaves similarly to a stable sintered body.

The FIGURE also shows that although cobalt is not an essential constituent of the positive electrode mass, the "graphite cells" of the present invention are at least the equal of conventional "cobalt cells" in terms of their normal capacity behavior.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An electric accumulator having a positive nickel-hydroxide electrode, a negative electrode comprised of a hydrogen storage alloy, an interposed separator and an alkaline electrolyte, wherein the positive electrode is comprised of a mixture of nickel hydroxide and an oxidation-resistant graphite having a crystallite size of at least 180 nm, an ash content of less than 0.5% and a BET area of less than 6 $m^2/g$, whereby the charge capacity of the positive electrode is stabilized by the oxidation-resistant graphite.

2. The electric accumulator of claim 1 wherein the crystallite size is at least 200 nm.

3. The electric accumulator of claim 1 wherein the ash content is less than 0.3%.

4. The electric accumulator of claim 1 wherein the nickel hydroxide mass is admixed in a proportion by weight of between 75 and 90%.

5. The electric accumulator of claim 4 wherein the proportion of the nickel hydroxide mass is approximately 85%.

6. The electric accumulator of claim 1 wherein the graphite is admixed in a proportion by weight of between 1 and 25%.

7. The electric accumulator of claim 1 wherein the proportion of the graphite is approximately 15%.

8. The electric accumulator of claim 1 wherein the graphite is admixed in a proportion by weight of up to 35%.

9. The electric accumulator of claim 1 wherein the electric accumulator is arranged in a button cell container.

* * * * *